Aug. 9, 1960

H. P. QUINN 2,948,812

CIRCUIT FOR GEIGER COUNTERS

Filed May 23, 1957

HALSEY P. QUINN
INVENTOR

BY Ralph E. Bitner

ATTORNEY

United States Patent Office 2,948,812
Patented Aug. 9, 1960

2,948,812

CIRCUIT FOR GEIGER COUNTERS

Halsey P. Quinn, Whippany, N.J., assignor, by mesne assignments, to Tung-Sol Electric Inc., Newark, N.J., a corporation of Delaware Filed May 23, 1957, Ser. No. 661,092

5 Claims. (Cl. 250—83.6)

This invention relates to a Geiger counter circuit for determining the amount of ionizing radiation incident upon a Geiger tube. The invention has particular reference to a circuit which produces accurate readings even though the source of potential connected to the circuit may be varied over a wide range of voltage values.

Geiger tubes have been connected to many types of amplifier circuits. One of these is known as a multivibrator circuit which comprises two amplifier tubes, one of which is normally conducting, the other being normally nonconductive. When ionizing radiation is incident upon the Geiger tube a current is passed through the tube and due to the voltage produced by the coupling circuit, conductance is transferred from one amplifier tube to the other thereby producing a current pulse which causes an indication on a meter. After a short time interval conduction is transferred so that normal conditions exist. This later transfer of conduction is accomplished without any external actions.

Such circuits are sensitive to variations of applied voltage because a lowering of the voltage supply not only lowers the height of the pulse but also shortens its duration thereby producing widely differing results in the meter circuit. The present invention comprises a circuit which is insensitive to such changes in supply potential and produces accurate meter readings for a wide range of voltage values, in this case from 135 volts to 100 volts.

One of the objects of this invention is to provide an improved Geiger counter circuit which avoids one or more of the disadvantages and limitations of prior art circuits.

Another object of the invention is to provide correct meter readings in a Geiger counter circuit when the amplifier supply potential varies considerably.

Another object of the invention is to provide an accurate measuring circuit which is portable, small in size, and low in weight.

Another object of the invention is to make possible the use of small batteries for the supply circuit of Geiger counters.

The invention comprises a Geiger counter circuit including the usual Geiger tube, a multivibrator arrangement having one degree of stability, a meter or other indicating instrument for recording the value of current pulses, and a diode discharge device connected across the anode-cathode circuit of the normally conducting amplifier tube in the multivibrator arrangement.

For a better understanding of the present invention, together with other and further objects thereof, reference is made to the following description taken in connection with the accompanying drawings.

Figure 1:
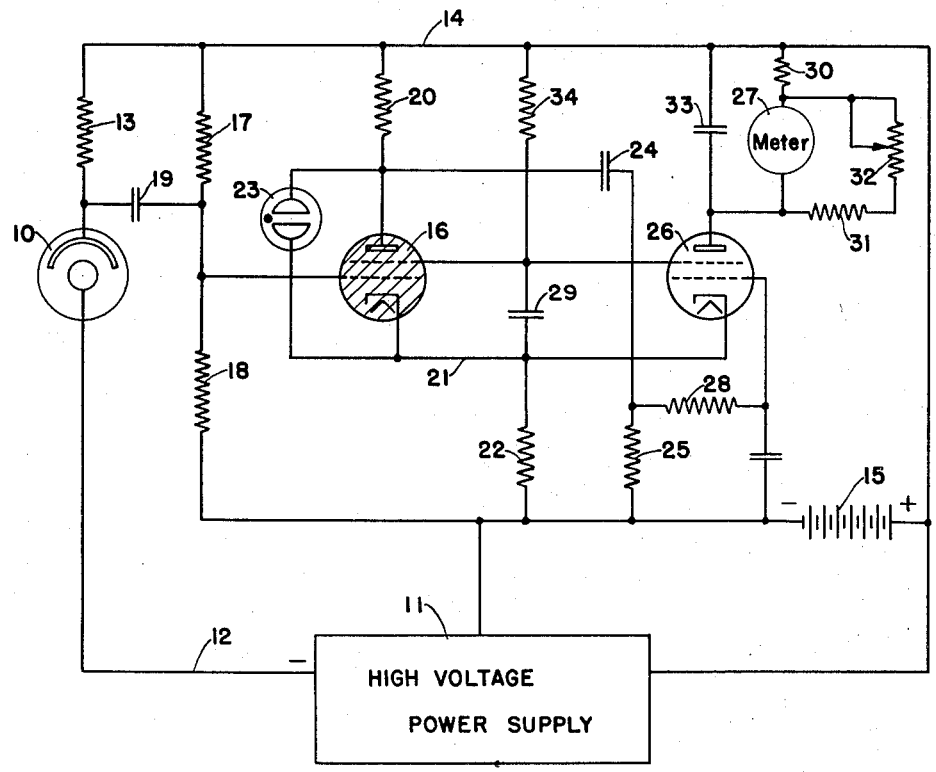
Fig. 1 is a schematic diagram of connections showing all the important components of the Geiger counter circuit.

Referring now to Fig. 1, the circuit includes a Geiger tube 10 having its cathode connected to the negative terminal of a high voltage power supply 11. This power supply may apply a negative voltage of about 800 volts to the cathode by means of conductor 12. The anode of the Geiger tube is connected through a high resistor 13 to a common high potential conductor 14 which is connected directly to the positive terminal of a battery 15 which in this case has a maximum potential of 135 volts but which may decrease to 100 volts during its useful life. The Geiger tube is coupled to the control electrode of an amplifier tube 16 by means of a coupling capacitor 19. The control electrode in this tube is normally maintained at a conducting potential by a voltage divider which includes resistors 17 and 18 bridged across the source of potential 15.

The multivibrator circuit includes amplifier tubes 16 and 26 and the associated circuitry. Tube 16 has its anode connected to conductor 14 through a high resistor 20 while its cathode is connected to the negative terminal of battery 15 through resistor 22. Tube 26 which is normally nonconducting has its anode connected through an indicating device 27, which may be an ordinary ammeter, to conductor 14 with its cathode connected to the cathode of tube 16 by common conductor 21. The control electrode of tube 26 is connected to the negative terminal of battery 15 through resistors 25 and 28, thereby rendering this tube normally nonconductive because the cathode of tube 26 is normally maintained at a small positive potential due to the voltage drop across resistor 22. The usual coupling capacitor 24 is connected between the anode of tube 16 and the control electrode of tube 26 through resistor 28, this being the coupling circuit through which tube 26 is rendered conducting when tube 16 is made nonconductive.

Tubes 16 and 26 may be either triodes, tetrodes, or pentodes. Fig. 1 shows these tubes as tetrodes with the screen grids of each tube connected to the positive conductor 14 through a supply resistor 34 and connected to the cathode circuit through a by-pass capacitor 29. The meter 27 is connected in series with a resistor 30 and is shunted by resistors 31 and a variable resistor 32, this circuit being used in order to adjust the calibration when different Geiger tubes are used in the circuit. The meter circuit is shunted by capacitor 33 for integrating the current pulses.

In order to compensate for changes in applied potential a diode discharge device 23 is connected across the anode and cathode of tube 16 and it is this component which provides all the compensation necessary for regulating the output current through meter 27.

The operation of this circuit is as follows: With tube 16 conducting and tubes 23 and 26 nonconducting there is no current through the meter 27 and no current through the Geiger tube 10. When ionizing radiation is incident upon Geiger tube 10 current flows through the tube and the anode of tube 10 is reduced in voltage thereby applying a negative potential through capacitor 19 to the control electrode of tube 16 and rendering this tube nonconductive. The decrease of current through tube 16 raises the voltage of its anode and transmits a positive voltage pulse through capacitor 24 and resistor 28 to the control electrode of tube 26 thereby making it conductive and sending current through meter 27 and capacitor 33. Under normal circumstances the anode voltage of tube 16 would rise very rapidly but in this circuit resistor 20 is made larger than usual and capacitor 24 is also made large, thereby increasing the time for the anode voltage to rise to its nonconducting value. This rise is indicated in Fig. 3 where the solid line 36 shows the approximate rise of the anode voltage when battery 15 is at its highest voltage and dotted line 37 indicating the approximate rise in voltage when battery 15 provides the circuit with a reduced voltage.

Figure 3:
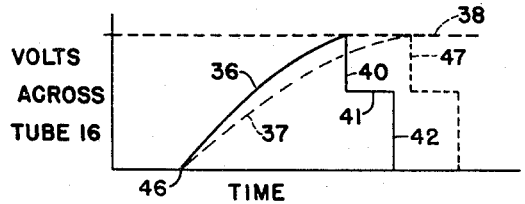
Fig. 3 is a graph showing the variation of voltage rise time across the anode-cathode of the normally conducting tube in the multivibrator circuit.

When the anode-cathode voltage rises to the firing voltage of gaseous discharge diode 23 the diode conducts and because of the increased current flow through the diode a sharp decrease in voltage, indicated in Fig. 3 by line 40, the anode-cathode voltage of tube 16 is reduced to a value indicated by line 41. This sharp decrease in voltage is transferred to the control electrode of tube 26 through capacitor 24 and causes tube 26 to again become nonconductive. With no current through tube 26 there is no current through resistor 22 and no voltage drop across it. This condition causes a positive potential to be applied to the control electrode in tube 16 and it is again made conductive. As soon as the current builds up through tube 16 the voltage drop across resistor 20 increases and the voltage drop across the diode 23 is reduced so that ionization cannot be maintained and the diode is made nonconductive (this condition indicated by line 42 in Fig. 3).

Figure 2:
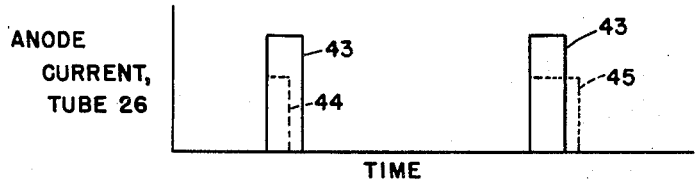
Fig. 2 is a graph showing the anode current through the normally nonconducting amplifier tube in the multivibrator circuit.

When the voltage of battery 15 is at its high value a current pulse is produced in the meter which is indicated in Fig. 2 by the solid lines 43. Under normal circumstances without the use of diode 23, a reduction of the voltage of battery 15 would produce a pulse which is lower in value and also shorter in time duration such as that indicated by dotted lines 44. This obviously produces a considerable error since the area under the dotted lines is only about half the area under solid line pulse 43. When the diode 23, which may be a neon lamp, is connected in the circuit as shown in Fig. 1 a reduction in voltage reduces the height of the pulse as before but the pulse duration is increased as indicated by dotted lines 45 and the area under the dotted lines is the same as the area under solid lines 43 thereby producing the same integrated current through meter 27 and maintaining the calibration of the instrument. The increase in time duration of the pulse is obviously due to the fact that the firing voltage of tube 23 is not attained until a later time when the voltage is low. This condition is graphically shown in Fig. 3 by dotted line 37. The start of the current pulse which passes through the meter is indicated in Fig. 3 by point 46 and the ends of the current pulses are indicated in Fig. 3 by lines 40 and 47.

While there have been described and illustrated a specific embodiment of the invention it will be obvious that changes and modifications can be made in the circuit without departing from the field of the invention which should be limited only by the scope of the appended claims.

I claim:

1. A Geiger counter circuit for indicating the presence of ionizing radiation comprising; a Geiger counter tube having an anode and a cathode within a gas-filled envelope and adapted to be made conductive when subjected to ionizing radiation; a monostable multivibrator circuit including a normally conducting and a normally nonconducting electron discharge device each of which contain a cathode, an anode, and a control electrode, said multivibrator circuit adapted to shift conductance from said normally conducting device to said normally nonconducting device when a negative pulse is applied to the control electrode of the normally conducting device, a coupling capacitor connected between the anode of said Geiger tube and the control electrode of said normally conducting device for applying a negative pulse thereto; an indicating means in the anode circuit of said normally nonconducting device for indicating the integral value of current caused by said shift of conductance; and a two-electrode gaseous discharge device connected across the anode and cathode of said normally conducting device, said discharge device being normally nonconducting but adapted to conduct and lower the voltage drop across said anode and cathode when said voltage drop has reached a predetermined value.

2. A Geiger counter circuit for indicating the presence of ionizing radiation comprising; a Geiger counter tube having two electrodes within a gas-filled envelope and adapted to be made conductive when subjected to ionizing radiation; a source of potential connected to said tube electrodes in series with a resistor; a monostable multivibrator circuit including two electron discharge devices each containing a cathode, an anode, and a control electrode, said multivibrator circuit adapted to shift conductance from one of said devices to the other when activated by a voltage pulse; a coupling capacitor connected between one of the electrodes of said Geiger tube and the multivibrator circuit for transferring a voltage pulse from the Geiger tube to said multivibrator circuit; a source of potential connected to said multivibrator circuit in series with a plurality of resistors; and a two-electrode gaseous discharge device connected to said multivibrator circuit, said discharge device being normally nonconducting but adapted to conduct and lower the voltage drop across a portion of said circuit when the voltage drop across the anode and cathode of the normally conductive electron discharge device has reached a predetermined value.

3. A Geiger counter circuit for indicating the presence of ionizing radiation comprising; a Geiger counter tube having an anode and a cathode within a gas-filled envelope and adapted to be made conductive when subjected to ionizing radiation; a first source of potential connected to said anode and cathode in series with a resistor; a monostable multivibrator circuit including a normally conducting electron discharge device and a normally nonconducting electron discharge device, each of which contain a cathode, an anode, and a control electrode, said multivibrator circuit adapted to shift conductance from said normally conducting device to said normally nonconducting device when a negative pulse is applied to the control electrode of the normally conducting device; a second source of potential connected to the anode-cathode circuits of both of said discharge devices in series with resistors; a coupling capacitor connected between the anode of said Geiger tube and the control electrode of said normally conducting device for applying a negative voltage pulse thereto; an indicating means in the anode circuit of the normally nonconducting device for indicating the integrated value of current caused by said shift of conductance; and a two-electrode discharge device connected across the anode and cathode of the normally conducting device, said discharge device being normally nonconducting but adapted to conduct and lower the voltage drop across said anode and cathode when said voltage drop has reached a predetermined value.

4. A Geiger counter circuit as set forth in claim 3 wherein said multivibrator circuit shifts conductance from the normally nonconducting device to the normally conducting device a predetermined time interval after a shift of conductance caused by the application of a voltage pulse.

5. A Geiger counter circuit as set forth in claim 3 wherein said two-electrode gaseous discharge device is normally nonconducting when said normally conducting electron discharge device is conducting and becomes conducting a time interval after said electron discharge device is made nonconducting, said time interval inversely proportional to the voltage of said second source of potential.

References Cited in the file of this patent

UNITED STATES PATENTS

| | | |
|---|---|---|
| 2,037,925 | Rentschler | Apr. 21, 1936 |
| 2,401,723 | Deming | June 11, 1946 |
| 2,728,861 | Glass | Dec. 27, 1955 |
| 2,824,237 | Witzel | Feb. 18, 1958 |

OTHER REFERENCES

Happell and Hesselberth: "Engineering Electronics," McGraw-Hill, 1953, pages 393 to 395.